June 28, 1927.

G. H. FLETCHER ET AL 1,633,935

COUPLING

Filed Aug. 13, 1925

2 Sheets-Sheet 1

WITNESSES:

INVENTORS
George H. Fletcher and
Hermann Rusby
BY
ATTORNEY

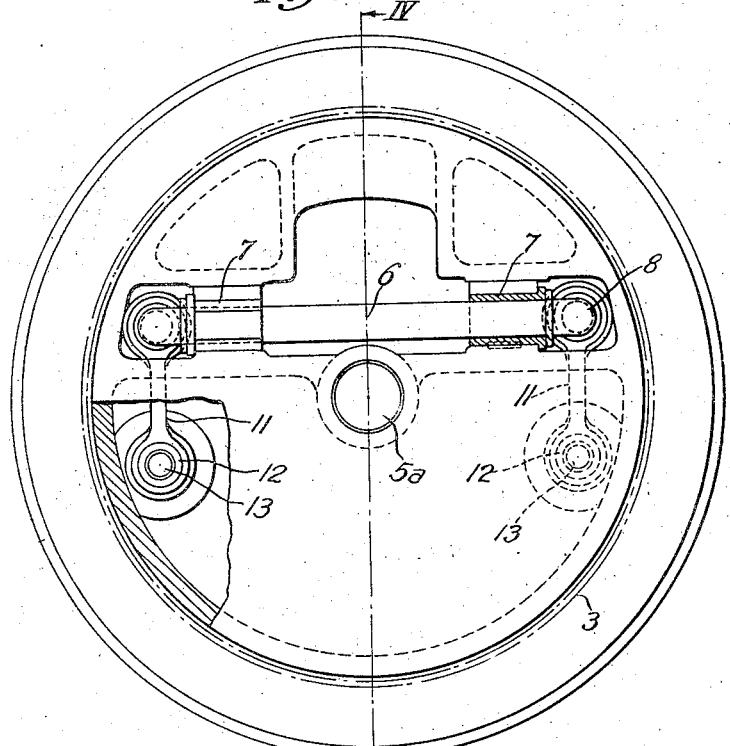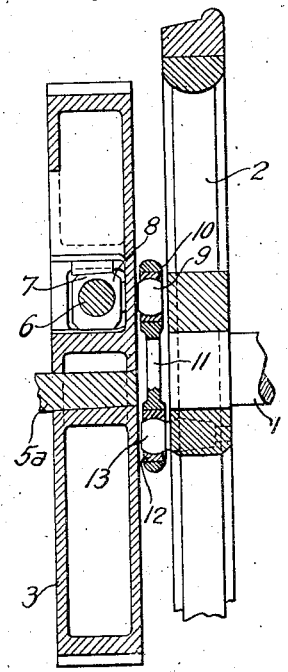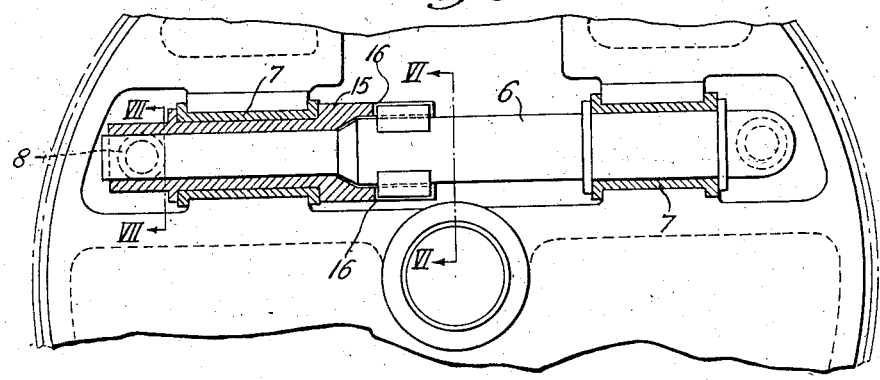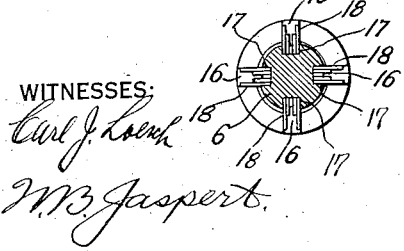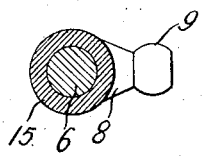

Patented June 28, 1927.

1,633,935

UNITED STATES PATENT OFFICE.

GEORGE HERBERT FLETCHER, OF SHEFFIELD, AND HERMANN RUSBY, OF STOCKSBRIDGE, ENGLAND, ASSIGNORS TO WESTINGHOUSE ELECTRIC & MANUFACTURING COMPANY, A CORPORATION OF PENNSYLVANIA.

COUPLING.

Application filed August 13, 1925, Serial No. 49,876, and in Great Britain August 14, 1924.

This invention relates to couplings for shafts or wheels carried thereon, and it has for its object to provide an improved coupling for two normally substantially coaxial shafts or wheels, in which provision is made for longitudinal displacements of the shafts and also for lateral displacements thereof in a plane perpendicular to the axes of the shafts. The improved coupling is obviously applicable to cases in which the shafts are normally eccentric or inclined at a comparatively small angle.

According to our invention, the improved coupling comprises two links each connected at one end, by a universal joint, to an arm on a shaft that is rotatable in bearings carried by one of the main shafts or wheels to be coupled, and having its axis perpendicular to the axis of said shaft or wheel, the other ends of the links being connected through universal joints to cranks that are mounted on the other of the shafts or wheels to be coupled.

Although capable of more general application, the invention is particularly adapted for transmitting torque from a driving motor to the truck wheels of a locomotive.

Figure 1:
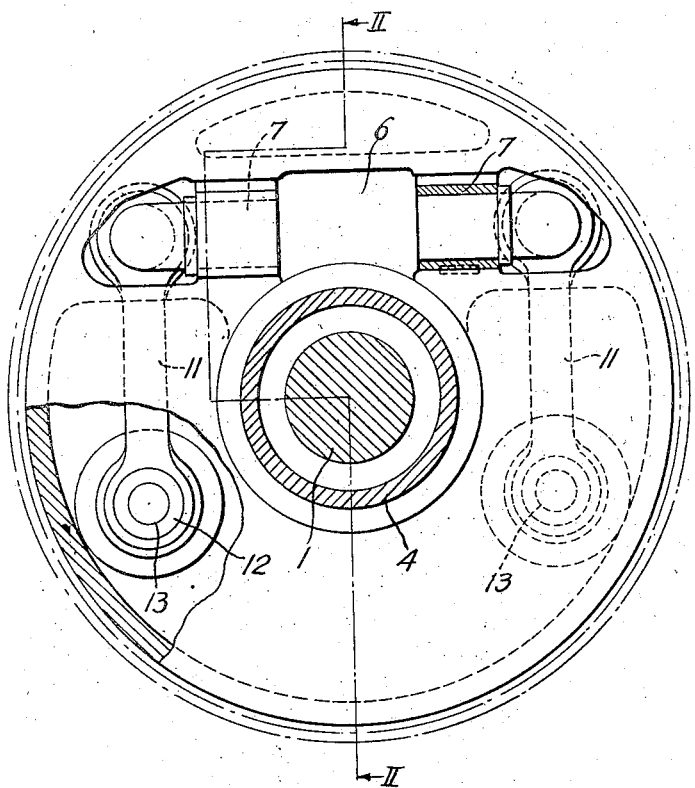
Figure 2:
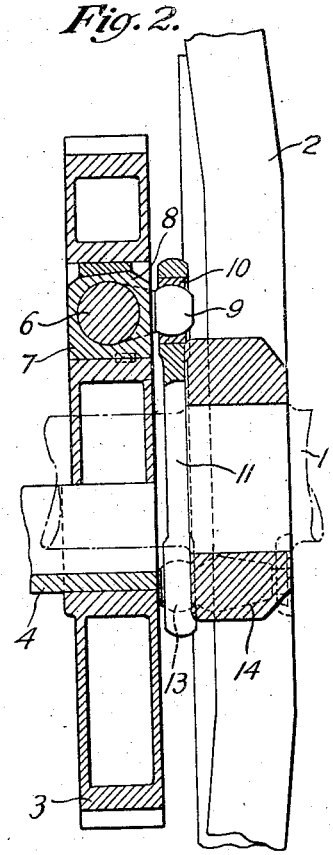

In the accompanying drawings constituting a part hereof and in which like reference characters designate like parts, Figs. 1 and 2 are respectively views in transverse section and in composite longitudinal section (for the most part on the line II—II of Fig. 1) of a truck wheel and quill shaft coupled in accordance with our invention.

Figs. 3 and 4 are respectively views in transverse section and in composite longitudinal section (for the most part on the lines IV—IV of Fig. 3) of a truck wheel and stub axle coupled in accordance with the invention, and Figs. 5 to 7 are respectively views in longitudinal section and in transverse section taken on the lines VI—VI and VII—VII of Fig. 5, of a modification applicable to either of the other forms illustrated.

In each form illustrated, an axle 1 carries truck wheels 2, and a gear-wheel 3 is provided, to which torque is transmitted from the driving motor (not shown) in any suitable manner. In the form illustrated in Figs. 1 and 2, this gear-wheel is mounted upon a quill shaft 4, which surrounds and is normally co-axial with the axle 1; while in the form illustrated in Figs. 3 and 4, it is mounted upon a stub shaft 5a, which is normally in axial alinement with the axle 1.

In each form illustrated, a shaft 6, which is transversely journalled in bearings 7 that are recessed into the gear-wheel 3, carries parallel cranks 8 that terminate in spherical portions 9. These spherical portions respectively engage correspondingly shaped bearings 10 at one end of each of a pair of links 11, which are located between the truck wheel 2 and the gear-wheel 3. At the opposite end of each link are spherical bearings 12, which receive spherical portions 13 of pins 14 that are secured to the corresponding truck wheel 2.

With either of these arrangements, it will be apparent that as the axle 1 is unsprung and the quill 4 or stub axle 5a, as the case may be, is carried by the sprung part of the frame, when the locomotive is in motion there will be a practically continuous variation in the relative positions of the axes of these parts. In each case torque is transmitted from the gear-wheel 3 to the truck wheel 2 by a thrust in the one and a pull in the other of the links 11 and, by virtue of the manner in which these links are connected to the gear-wheel 3 and truck wheel 2, it follows that, within certain limits of displacement of the axes of these wheels, if a constant torque is applied to the gear wheel 3, a substantially constant torque will be transmitted to the truck wheel 2, and the relative angular velocity of the two wheels will be substantially zero.

It will be obvious that, in either form of coupling herein described, the parts associated with the gear wheel and the truck wheel may be mutually interchanged and that, in its general application, it is immaterial from which of the parts connected by the coupling torque is transmitted.

In some cases, particularly in the applications outlined above, it may be desired to introduce a certain degree of flexibility, such as has heretofore been effected by interposing a resilient connection between the hub and the rim of a truck wheel. The substantial equivalent of this structure can readily be introduced into the coupling forming the subject of the present invention, by adopting a construction such as is illustrated in Figs. 5 to 7 of the drawings.

In this construction, which is applicable to either of the arrangements described above, the shaft 6 is surrounded for approximately half of its length by a sleeve 15, which carries one of the cranks 8. This sleeve, for the most part, has a close bearing fit on the shaft 6, but at its inner end a clearance is provided between it and the shaft, and a number of axial slots 16 are formed therein. These slots register with grooves 17 that are formed in the shaft 6, and in these grooves are anchored leaf springs 18, which project into the slots 16 and thereby resiliently connect the shaft 6 with the sleeve 15.

Although we have described a specific embodiment of our invention it will be obvious to those skilled in the art that various modifications may be made in the details of construction and in the arrangement of the several cooperating parts without departing from the principles herein set forth.

We claim as our invention:—

1. A coupling comprising a pair of co-operating members to be coupled, a shaft journalled in one of said members transversely to the axis thereof, a plurality of cranks on said shaft, and a pair of links respectively connected by universal joints at opposite ends of said shaft to said cranks and to the other co-operating member.

2. A coupling comprising a pair of co-operating members to be coupled, a shaft journalled in one of said members transversely to the axis thereof, a plurality of cranks on said shaft, and a pair of links having their axes disposed in parallel relation and respectively connected by universal joints at opposite ends of said shaft to said cranks and to the other co-operating member.

3. A coupling comprising a pair of co-operating members to be coupled, a shaft journalled in one of said members transversely to the axis thereof, a plurality of cranks on said shaft, and a pair of links respectively connected by universal joints at opposite ends of said shaft, to said cranks and to the other co-operating member, said pair of links being disposed with their axes in parallel relation on opposite sides of the axis of said members.

4. A coupling comprising a pair of co-operating members to be coupled, a shaft journalled in one of said members transversely to the axis thereof, a plurality of cranks on said shaft, and a pair of links respectively connected by universal joints at opposite ends of said shaft, to said cranks and to the other co-operating member, said pair of links being disposed with their axes in parallel relation on opposite sides of the axis of said members, said cranks being resiliently connected in parallelism.

5. A coupling comprising a pair of co-operating members to be coupled, a shaft journalled in one of said members transversely to the axis thereof, a plurality of cranks on said shaft, and a pair of links respectively connected by universal joints at opposite ends of said shaft to said cranks and to the other co-operating member, said shaft having a flexible element associated therewith.

6. A coupling comprising a pair of co-operating members to be coupled, a shaft journalled in one of said members transversely to the axis thereof, a plurality of cranks on said shaft, and a pair of links respectively connected by universal joints at opposite ends of said shaft to said cranks and to the other co-operating member, said pair of links being disposed with their axes in parallel relation on opposite sides of the axis of said members, and said shaft having flexible elements associated therewith.

7. A shaft coupling comprising a driving and a driven member, a shaft journalled in the driving member transversely to the axis thereof, a plurality of crank arms on said shaft, links respectively connected by universal joints to said crank arms and to said driven member.

In testimony whereof, we have hereunto subscribed our names this 22nd day of July, 1925.

GEORGE HERBERT FLETCHER.
HERMANN RUSBY.